Figure 1:
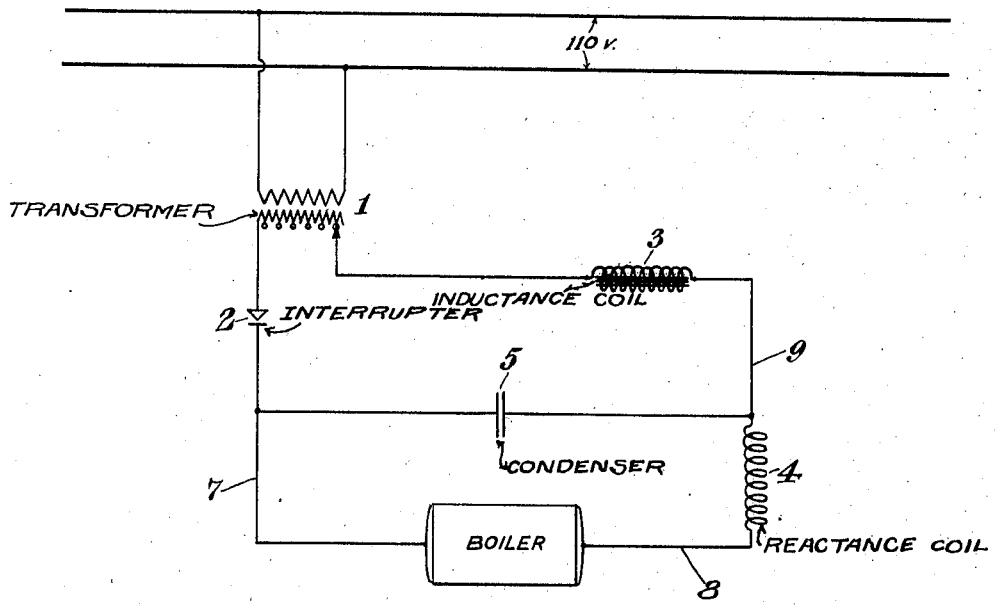

Nov. 26, 1929.    W. THALHOFER    1,736,986

PROTECTION OF METALLIC SURFACES AGAINST INCRUSTRATION AND CORROSION

Original Filed Aug. 19, 1925

Inventor
Walter Thalhofer
By his Attorneys
Ward Crosby & Smith

Patented Nov. 26, 1929

1,736,986

UNITED STATES PATENT OFFICE

WALTER THALHOFER, OF VIENNA, AUSTRIA, ASSIGNOR TO A. G. FÜR CHEMISCHE INDUSTRIE IN LIECHTENSTEIN, OF SCHAAN, LIECHTENSTEIN

PROTECTION OF METALLIC SURFACES AGAINST INCRUSTATION AND CORROSION

Application filed August 19, 1925, Serial No. 51,190, and in Austria August 21, 1924. Renewed October 15, 1929.

This invention relates to the protection of metallic surfaces against incrustation and corrosion, and it is particularly useful, although not limited to, the prevention of scale in boilers and other shells or devices in which water is evaporated or in which hot water is contained.

According to this invention, the protection is obtained by the application of electric current to the metallic device to be protected.

Various systems for protecting metallic surfaces by electric current have been suggested, and in my copending United States application Serial No. 596,774, filed October 25, 1922, and renewed February 2, 1925, I disclosed a system for protecting metallic surfaces by applying to the shell of the container at remotely spaced points a very small electric current and voltage, the particular source of current disclosed in that application being an undisturbed direct current source. In a subsequent copending application Serial No. 657,457, filed August 14, 1923, for the protection of metallic surfaces against incrustation and corrosion, I disclosed the idea of applying these minute currents and voltages to the device to be protected, in the form of "pulsating currents"; that is to say, currents other than undisturbed direct currents. It was found that "pulsating currents" greatly intensified the protective action, and that particularly good results were obtained where an interrupter was used in the circuit. In the present application I also use the term "pulsating currents" or "pulsating current" in the sense as above defined.

According to one phase of the present invention, further improved results have been obtained by utilizing reactances in the form of either induction devices or capacity devices or both, to disturb, alter or deform the current form or characteristic or so-called wave form. For example, if an undisturbed direct current source is used with a device such for example as a vibrator to disturb the current, if one or more reactance devices such for example as induction coils and/or condensers are connected with the circuit, improved results are obtained. Also, if the pulsating current be in the form of a regular pulsating current or in the form of a regular sine wave alternating current of ordinary commercial frequencies—up to say 40 cycles per second—the protective effect is greatly improved by the use of the above described apparatus for distorting or altering the wave form. At higher alternating current frequencies the interrupter may be omitted. According to another phase of the invention oscillating circuits are provided for energizing the boiler, and in the preferred embodiment of the invention the reactance device or devices are so connected with respect to the source of current and the boiler or other device to be protected, as to provide the oscillating circuit in which the boiler is included.

The invention consists in the method of and apparatus for protecting metallic surfaces by electric current which is hereinafter described by way of example, in accordance with certain preferred ways of carrying out the method, and utilizing certain preferred forms of apparatus embodying the invention; and the invention is more particularly pointed out in the appended claims.

Further objects and advantages of the invention will more fully appear from the following description taken in connection with the accompanying drawings illustrating by way of example certain embodiments of the invention.

Figure 2:
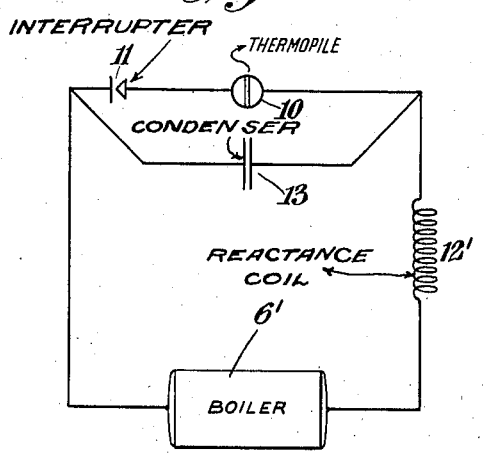
Figure 3:
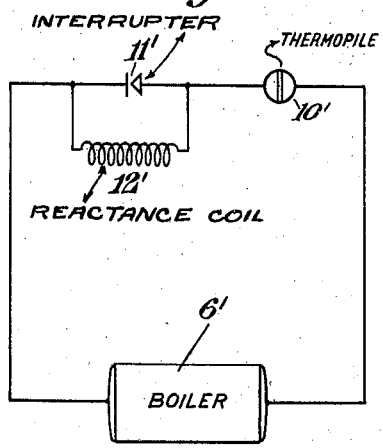

Referring to the drawings, Fig. 1 is a diagrammatic illustration of the manner of utilizing a source of alternating current;

Fig. 2 is a diagrammatic view of a system utilizing a direct current source; and Fig. 3 is a modification.

Referring to Fig. 1, 1 is a transformer, in this case preferably of the bell ringing transformer type, connected across a suitable sine wave alternating current source of commercial voltage, say 110 to 250 volts, the secondary of which is connected with a vibrator 2, an induction coil 3, a reactance coil 4, a condenser 5, and the device to be protected such as a boiler 6. In the system shown, the current passes from one end of the secondary of the transformer, through the vibrator 2 and through wire 7, directly to the boiler shell to which the wire is connected. Current flows through the boiler shell, thence out along wire 8, connected at a remotely spaced point of the boiler shell, and directly to it, thence through the reactance coil 4, along wire 9, through the induction coil 3, back to the secondary. The condenser 5 in this illustration is connected across the wires 7 and 9 so as to provide an oscillating circuit including said condenser 5, wire 7, the boiler, and coil 4; this circuit being energized by the impressed potential from the transformer 1. In this particular system illustrated, induction coil 3 is of 5400 turns and of 300 ohms resistance. The condenser 5 is of a capacity of about 2 microfarads, and the reactance coil 4 is of approximately .8 of an ohm. The interrupter 2 may be of any type which discontinues or disturbs the current, and it may be of a type to completely make and break or make and break and reverse the current, or may be provided with a shunt circuit around it to prevent a complete make and break.

In the particular system shown, the voltage in the secondary of the transformer is reduced from the power circuit voltage to about 8 volts across the full secondary. This in the apparatus described provides about 25 milliamperes through the secondary circuit applied to the boiler of about .005 ohms. In the case of utilizing a regular alternating current whose frequency is not above 40 cycles per second, the interrupter or disturber 2 is found to be desirable for obtaining proper results, but with frequencies somewhat above this the interrupter 2 may be dispensed with.

Fig. 2 illustrates a diagrammatic system utilizing a direct current source of energy 10, an interrupter or current disturber 11, a reactance coil 12, and a condenser 13 connected to boiler 6'. In this embodiment as in Fig. 1, the condenser 13 is also connected so as to provide an oscillating circuit including the boiler 6', coil 12' and said condenser. In Fig. 3 the condenser is omitted and coil 12' is connected across interrupter 11'. In this case no oscillating circuit is provided for the boiler.

According to the preferred form of the invention, I prefer to utilize very minute currents and voltages applied to the boiler, and to connect both poles of the circuit directly to the boiler shell and to so connect the reactance device or devices as to provide an oscillating circuit including the boiler. The current applied to the boiler and hence the voltage across the boiler will necessarily vary depending upon the size of the boiler or other container to be protected, but by way of example I may point out that in the case of say a 500 H. P. boiler of approximately 400 square meters of heating surface, the total current flowing through the boiler can be made, in the case of a pulsating direct current, to pulsate between the values of 80 to 160 milliamperes. Again, in the case of a boiler of approximately 150 H. P. with about 120 square meters of heating surface, the total current applied to the boiler may be about 20 milliamperes. The resistance of this size boiler being about .005 ohms, the drop of potential across the boiler or impressed voltage at the connected points to the boiler would be about .1 millivolt.

While according to the preferred manner of practicing the invention I prefer to use the current in a closed circuit to the boiler, and to use an impressed voltage below that of the decomposition of water and many times below it, such for example as utilizing the currents and voltages at the boiler, of the order of magnitude above set forth by way of example, yet I do not wish to be understood as limiting my invention as to its broader aspects, to such features and infinitesimal voltages and current strengths, because I believe that the provision of reactance devices in connection with the protective circuits, gives improved results with other systems utilizing currents to protect metallic surfaces from incrustation and corrosion, such for example as the open circuit systems using higher voltages and larger currents. In some instances and under some circumstances and where it may be convenient, the circuit may be connected with the ground which may be utilized as the capacity means or device.

While I have described my invention in detail in connection with the preferred embodiments set forth, it will be obvious to those skilled in the art, after understanding my invention, that changes and modifications may be made therein without departing from the spirit or scope of the invention, and I do not wish to be understood as limiting myself other than as indicated in the appended claims.

What I claim as new and desire to secure by Letters Patent, is:

1. Method of protecting from incrustations and corrosion metallic surfaces, which comprises applying to the device the metallic surface of which is to be protected, an interrupted pulsating electric current whose form characteristic as applied to the device has been substantially altered or distorted by subjecting it to the influence of one or more reactance devices.

2. Method of protecting from incrustations and corrosion metallic surfaces, which comprises applying to the device the metallic surface of which is to be protected, electric current whose form characteristic as applied to the device has been substantially altered or distorted by subjecting it to capacity and inductance devices.

3. Method of protecting from incrustations and corrosion metallic surfaces, which comprises applying to the device the metallic surface of which is to be protected, an electric current whose form characteristic as applied to the device to be protected has been substantially altered or distorted by subjecting it to the influence of a reactance device and an interrupter.

4. Method of protecting from incrustations and corrosion metallic surfaces, which comprises connecting both poles of a source of pulsating current to the metal of the metallic device to be protected or to connected metallic parts, at remotely spaced points to get a distributed flow of current through the metal of said device and causing a pulsating electric current to flow through the metal of said device, of a magnitude insufficient to produce a drop of potential across said connected points high enough to decompose water, and substantially altering or distorting the form characteristic of said pulsating current by subjecting it to the influence of one or more reactance devices.

5. Method of protecting from incrustations and corrosion metallic surfaces, which comprises connecting both poles of a source of pulsating current to the metal of the metallic device to be protected or to connected metallic parts, at remotely spaced points to get a distributed flow of current through the metal of said device and causing a pulsating electric current to flow through the metal of said device, having an applied voltage at said remotely spaced points of the device, of but a small fraction of a volt, and substantially altering or distorting the form characteristic of said current by subjecting the current to the influence of inductance and capacity devices.

6. Method of protecting from incrustations and corrosion metallic surfaces, which comprises connecting both poles of a source of pulsating current to the metal of the metallic device to be protected or to connected metallic parts, at remotely spaced points to get a distributed flow of current through the metal of said device and causing a pulsating electric current to flow through the metal of said device, having an applied voltage at said remotely spaced points of the device, of not more than a few millivolts, and substantially altering or distorting the form characteristic of said current by subjecting the current to the influence of one or more reactance devices.

7. Method of protecting from incrustations and corrosion metallic surfaces, which comprises providing an oscillating circuit for energizing the device the metallic surface of which is to be protected, and subjecting said circuit and device to the influence of a pulsating electromotive force.

8. Method of protecting from incrustations and corrosion metallic surfaces, which comprises providing an oscillating circuit including the device the metallic surface of which is to be protected, and subjecting said circuit to the influence of a pulsating electromotive force the source of which is also connected in a circuit with said device to be protected.

9. Method of protecting from incrustations and corrosion metallic surfaces, which comprises connecting up one or more reactance devices with the device the metallic surface of which is to be protected, so as to provide an oscillating circuit including said device to be protected, and subjecting said oscillating circuit to the influence of a pulsating electromotive force.

10. In a system of the character described, the combination of a metallic device to be protected from incrustations and corrosions, an oscillating circuit including said device to be protected, and a second circuit including a source of pulsating electromotive force, said two circuits being interconnected so that the oscillating circuit is energized by said source.

11. In a system of the character described, the combination of a metallic device to be protected from incrustations and corrosion, one or more reactance devices connected with the device to be protected so as to provide an oscillating circuit including said device to be protected, and a second circuit including a source of pulsating electromotive force, said two circuits being interconnected and the oscillating circuit being energized by said source.

12. In a system of the character described, the combination of a metallic device to be protected from incrustations and corrosion, an oscillating circuit including said device to be protected, and a second circuit including a source of pulsating electromotive force, said two circuits having a portion thereof in common.

13. In a system of the character described, the combination of a metallic device to be protected from incrustations and corrosion, apparatus and circuits including an interrupter for supplying a pulsating electric current to said metallic device and one or more reactance devices operatively related to said circuits and acting to substantially alter or disturb the form characteristic of the current of the circuit.

14. In a system of the character described, the combination of a metallic device to be protected from incrustations and corrosion, a source of pulsating current connected at remotely spaced points of said metallic device, and in closed circuit with said device and delivering to said device pulsating current with an impressed voltage at said connecting points of the source to said device, below that necessary to decompose water, and one or more reactance devices connected with said circuit and acting to substantially alter or distort the form characteristic of the current applied to said device.

15. In a system of the character described, the combination of a metallic device to be protected from incrustations and corrosion, electric apparatus connected at remotely spaced points of said metallic device, and in closed circuit with said device and delivering to said device pulsating currents with an impressed voltage at said connecting points of the source to said device, of but a small fraction of a volt, and inductance and capacity devices operatively related to said circuit and acting to substantially alter or distort the form characteristic of said current applied to said device.

In testimony whereof I have signed my name to this specification.

WALTER THALHOFER.